United States Patent
Song

(10) Patent No.: US 7,251,279 B2
(45) Date of Patent: Jul. 31, 2007

(54) APPARATUS OF MOTION ESTIMATION AND MODE DECISION AND METHOD THEREOF

(75) Inventor: Byung-cheol Song, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 369 days.

(21) Appl. No.: 10/214,310

(22) Filed: Aug. 8, 2002

(65) Prior Publication Data

US 2003/0123547 A1    Jul. 3, 2003

(30) Foreign Application Priority Data

Jan. 2, 2002    (KR) .................................... 2002-110

(51) Int. Cl.
*H04B 1/66*    (2006.01)

(52) U.S. Cl. .................... 375/240.16; 375/240.13; 375/240.14; 375/240.12; 375/240.15; 348/699; 382/238

(58) Field of Classification Search ........... 375/240.16, 375/240.12, 240.13, 240.25, 240.26, 240.21, 375/240.14, 240.15; 348/699, 441, 446, 348/607; 382/238, 236

See application file for complete search history.

(56) References Cited

U.S. PATENT DOCUMENTS

| | | | | |
|---|---|---|---|---|
| 5,311,310 A | * | 5/1994 | Jozawa et al. | 375/240.13 |
| 5,528,300 A | * | 6/1996 | Kim | 375/240.12 |
| 5,557,341 A | * | 9/1996 | Weiss et al. | 348/699 |
| 6,671,319 B1 | * | 12/2003 | Chang et al. | 375/240.16 |

* cited by examiner

*Primary Examiner*—Shawn S. An
(74) *Attorney, Agent, or Firm*—Staas & Halsey LLP

(57) ABSTRACT

An apparatus and method of motion estimation and mode decision includes a candidate vector group generation unit generating a candidate vector group including a motion vector of an adjacent image crossing a first macro block, where the first macro block is a macro block of an image before scaling, and the first macro block and the adjacent image exist in a same sub-group of a picture (sub-GOP). A motion vector estimation unit estimates a base vector of a second macro block from the motion vector and the candidate vector group of the first macro block overlapped with the second macro block, where the second macro block is a macro block of an image after scaling. A mode decision unit determines a mode of the second macro block from the estimated base vector and a mode of the first macro block.

24 Claims, 10 Drawing Sheets

INTERLACED SCAN

PROGRESSIVE SCAN

APPARATUS OF MOTION ESTIMATION AND MODE DECISION AND METHOD THEREOF

CROSS-REFERENCE TO RELATED APPLICATIONS

This application claims the benefit of Korean Application No. 2002-110, filed Jan. 2, 2002, in the Korean Patent Office, the disclosure of which is incorporated herein by reference.

BACKGROUND OF THE INVENTION

1. Field of the Invention

The present invention relates to an apparatus of motion estimation and a mode decision and a method thereof, and more particularly, to an apparatus capable of performing a motion estimation and a mode decision at a high speed in a scan format conversion, and a method thereof.

2. Description of the Related Art

Generally, methods to realize a digital image are divided into an interlaced scan and a progressive scan according to a structure of a frame. Referring to FIG. 1A, the interlaced scan constructs one frame, which is realized from two fields after one field (top field) scans odd lines (marked with a solid line) and another field (bottom field) scans even lines (marked with a dotted line). Therefore, a height of each of the fields is a half of a height of the frame. The above method is used to realize a high-resolution picture such as 1024×768 at a low frequency, but provides a flickering picture. On the other hand, referring to FIG. 1B, the progressive scan makes one frame by scanning an image signal one line by one line when realizing one frame. Compared with the interlaced scan, the progressive scan provides a less flickering picture.

Further, there are three types of frames defined in a MPEG standard: an inter coded frame (an I frame), a predictive coded frame (a P frame), and a bi-directionally-predictive coded frame (a B frame). The P frame and the B frame have a high-compression rate by performing motion compensation/estimation.

The I frame is coded without referring to other frames. The P frame is coded by referring to a past frame, in other words, a reverse I frame or a reverse P frame. Compression of the digital image is effectively performed when coding a predictive error and motion information after performing a motion information estimation and a motion compensation estimation between the reverse I frame or the reverse P frame and a current P frame.

The B frame is a frame having a highest compression rate. Furthermore, the B frame performs estimation by referring not only to the reverse I frame or the reverse P frame but also to a forward I frame or a forward P frame. The B frame uses the motion compensation estimation like the P frame. In addition, the B frame uses two reference frames, and selects the frame having a better estimation accuracy from two reference frames, and thus, the B frame has the highest compression rate. However, the B frame does not become a reference frame for other frames. Unlike the B frame, the I frame and the P frame become reference frames for other frames.

FIG. 2 is a view schematically showing a conventional transcoder. Referring to FIG. 2, the transcoder 200 has a variable length decoder (VLD) 201, first and second inverse quantizers (IQ) 203a and 203b, first and second inverse discrete cosine transformers (IDCT) 205a and 205b, first and second adders 207a and 207b, a motion compensator (MC) 209a, a motion estimation compensator (MEC) 209b, a down sampler (DSamp) 211, a subtractor 213, a discrete cosine transformer (DCT) 215, a quantizer (Q) 217, and a variable length coder (VLC) 219.

The VLD 201 reduces an amount of data by marking a length of a sign in accordance with a frequency of data generation. The first IQ 203a inverse quantizes DCT coefficients encoded by the VLD 201. The first IQ 203a provides the inverse quantized DCT coefficients to the first IDCT 205a and the second IDCT 205b. The first IDCT 205a and the second IDCT and 205b provide the first adder 207a with a predictive error signal that is obtained by inverse discrete cosine transforming the inverse quantized DCT coefficients. The first adder 207a adds the predictive error signal and a predictive signal. Here, 'predictive' is defined as calculating a difference of a pixel data between a frame and a field. In other words, after searching a macro block that best matches the macro block on a frame/field to be currently processed, among the data of a frame/field previously processed, a motion vector is detected based on a direction of motion of the best matched macro block.

The MC 209a predicts motion estimation according to an encoding order of motion vector input, and transmits a predictive signal to the first adder 207a. The first adder 207a adds the predictive error signal and the predictive signal, and transmits an added signal to the DSamp 211. The DSamp 211 reduces a size of the signal that is restored and added. A down scaled image signal is input into the subtractor 213. The subtractor 213 subtracts a predicted motion compensation signal from the down scaled image signal, and provides a gained predictive error signal to the DCT 215. The DCT 215 produces DCT of the gained predictive error signal, and provides DCT coefficients to the Q 217. The Q 217 quantizes the DCT coefficients.

The Q 217 provides the quantized DCT coefficients to the VLC 219 and at the same time, to the second IQ 203b. The second IQ 203b inversely quantizes the DCT coefficients. The second IQ 203b provides the inversely quantized DCT coefficients to the second IDCT 205b. The second IDCT 205b inverse discrete cosine transforms the inversely quantized DCT coefficients, and provides a gained predictive error signal to the second adder 207b. The second adder 207b adds the gained predictive error signal and the predictive predicted motion compensation signal, and provides an added signal to the MEC 209b. The MEC 209b predicts the motion compensation signal from the input motion vector according to an order of coding. The MEC 209b provides the predicted motion compensation signal to the subtractor 213, and at the same time, to the second adder 207b. The VLC 219 outputs a bit stream gained from variable length coding a type of the input picture, the motion vector, and the quantized DCT coefficients.

Furthermore, while the MPEG2 bit stream input into the transcoder is the interlaced scan, the output needs to be converted into a progressive scan method according to the displaying apparatus. However, the conventional transcoder can perform transcoding when an input scan format and an output scan format are the same. Therefore, there has not been introduced a transcoder capable of effectively re-encoding a converted sequence when the scan format input into a decoder and the scan format output from an encoder are different from each other.

In addition, the conventional transcoder cannot support 18 types of ATSC format. In other words, the transcoding to reduce a size or a bit rate of the image, or a frame rate has been introduced, but not for changing the scan format. For example, when a 1920×1080 interlaced input image is converted into a 720×480 progressive output image, the type of the frame is changed when transcoding, thus there is a limit to estimate the motion at a high velocity.

SUMMARY OF THE INVENTION

Various objects and advantages of the invention will be set forth in part in the description that follows and, in part, will be obvious from the description, or may be learned by practice of the invention.

The present invention has been made to overcome the above-mentioned problems of the related art. Accordingly, it is the object of the present invention to provide an apparatus and method for motion estimation and mode decision, which is capable of improving coding speed while maintaining the same compression efficiency.

To accomplish the above and other objects of the present invention, there is provided an apparatus of motion estimation and mode decision, including: a candidate vector group generation unit generating a candidate vector group including a motion vector of an adjacent image crossing a first macro block, wherein the first macro block is a macro block of an image before scaling, and the first macro block and the adjacent image exist in a same sub-group of a picture (sub-GOP); a motion vector estimation unit estimating a base vector of a second macro block from the motion vector and the candidate vector group of the first macro block overlapped with the second macro block, wherein the second macro block is a macro block of the image after scaling; and a mode decision unit determining a mode of the second macro block from the estimated base vector and a mode of the first macro block.

In accordance with a type of the image, the motion vector estimation unit calculates a sum of an absolute difference (SAD) according to the motion vector and the candidate vector group of the first macro block overlapped with the second macro block, and estimates a motion vector having a minimum SAD to be the base vector of the second macro block.

The motion vector estimation unit includes: a candidate macro block extraction unit calculating a first median value from the motion vector of the first macro block overlapped with the second macro block, and extracting from the first macro block overlapped with the second macro block a candidate macro block having a motion vector close to the first median value; and a base vector estimation unit calculating the SAD according to the motion vector and a candidate vector group of the extracted candidate macro block, and estimating the motion vector having the minimum value of the SAD to be the base vector of the second macro block.

In accordance with a type of the image, the motion vector estimation unit calculates either a median value or an average value according to the motion vector and the candidate vector group of the first macro block overlapped with the second macro block, and estimates the calculated value as a base vector.

The motion vector estimation unit includes a candidate macro block extraction unit obtaining a first median value from the motion vector of the first macro block overlapped with the second macro block, and extracting from the first macro block overlapped with the second macro block, a candidate macro block having a motion vector close to the first median value; and a base vector estimation unit calculating either the median value or the average value according to the motion vector and the candidate vector group of the extracted candidate macro block, and estimating the calculated value to be a base vector of the second macro block.

The mode decision unit determines the second macro block to be an intra mode when a portion of the intra mode in the first macro block overlapped with the second macro block is above a predetermined value, and determines the second macro block to be an inter mode when the portion of the intra mode in the first macro block overlapped with the second macro block is below the predetermined value.

When the second macro block is determined to be the inter mode and there is no candidate vector group of the first macro block, the motion vector estimation unit includes: a candidate vector extraction unit calculating a candidate vector from motion vectors of one or more adjacent macro blocks close to the second macro block; and a base vector estimation unit estimating a motion vector having the minimum value of SAD to be the base vector of the second macro block by comparing the SAD according to the extracted candidate vector and the motion vector of the first macro block overlapped with the second macro block.

The candidate vector is a median value and/or an average value of the motion vector of one or more of the adjacent macro blocks. When the adjacent macro blocks are not close to the second macro block, the motion vector estimation unit decides the motion vector having the minimum value of SAD to be the base vector of the second macro block by comparing the SAD according to the motion vector of the first macro block overlapped with the second macro block.

The mode decision unit determines the mode of the second macro block to be an intra mode when the mode of the first macro block overlapped with the second macro block is the intra mode. Also provided is a scan format distinction unit comparing and determining scan formats of the first macro block and the second macro block. The candidate vector group generation unit generates the candidate vector group when the scan formats of the first macro block and the second macro block are different.

To accomplish the above and other objects of the present invention, there is provided a method of motion estimation and mode decision according to an embodiment of the present invention, including: generating a candidate vector group including a motion vector of an adjacent image crossing a first macro block, the first macro block being a macro block of an image before scaling, and the first macro block and the adjacent image existing in a same sub-group of picture (sub-GOP); estimating a base vector of a second macro block from the motion vector and the candidate vector group of the first macro block overlapped with the second macro block, wherein the second macro block is a macro block of the image after scaling; and determining a mode of the second macro block from the estimated base vector and a mode of the first macro block.

In accordance with a type of the image, the estimating of the base vector includes calculating a sum of an absolute difference (SAD) according to the motion vector and the candidate vector group of the first macro block overlapped with the second macro block, and estimating a motion vector having a minimum SAD to be the base vector of the second macro block.

The estimating of the base vector includes: calculating a first median value from the motion vector of the first macro block overlapped with the second macro block, and extracting from the first macro block overlapped with the second macro block a candidate macro block having a motion vector close to the first median value; and calculating the SAD according to the motion vector and a candidate vector group of the extracted candidate macro block, and estimating the motion vector having the minimum value of the SAD to be the base vector of the second macro block.

In accordance with a type of the image, the estimating of the base vector includes calculating a median value or an average value according to the motion vector and the candidate vector group of the first macro block overlapped with the second macro block, and estimating the calculated value as a base vector.

The estimating of the base vector includes: obtaining a first median value from the motion vector of the first macro block overlapped with the second macro block, and extracting from the first macro block overlapped with the second macro block a candidate macro block having a motion vector close to the first median value; and calculating the median value or the average value according to the motion vector and the candidate vector group of the extracted candidate macro block, and estimating the calculated value to be a base vector of the second macro block.

The determining of the mode includes determining the second macro block to be an intra mode when a portion of the intra mode in the first macro block overlapped with the second macro block is above a predetermined value, and determining the second macro block to be an inter mode when the portion of the intra mode in the first macro block overlapped with the second macro block is below the predetermined value.

When the second macro block is determined to be the inter mode and there is no candidate vector group of the first macro block, the estimating of the base vector includes: calculating a candidate vector from motion vectors of one or more adjacent macro blocks close to the second macro block; and estimating a motion vector having the minimum value of SAD to be the base vector of the second macro block by comparing the SAD according to the extracted candidate vector and the motion vector of the first macro block overlapped with the second macro block.

The candidate vector is a median value and/or an average value of the motion vector of one or more of the adjacent macro blocks. When the adjacent macro blocks are not close to the second macro block, the estimating of the base vector further includes determining the motion vector having the minimum value of SAD to be the base vector of the second macro block by comparing the SAD according to the motion vector of the first macro block overlapped with the second macro block.

The determining of the mode determines the mode of the second macro block to be an intra mode when the mode of the first macro block overlapped with the second macro block is the intra mode. Also provided is comparing and determining scan formats of the first macro block and the second macro block. The generating of the candidate vector group includes generating the candidate vector group when the scan formats of the first macro block and the second macro block are different.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above-mentioned object and the feature of the present invention will be more apparent by describing the preferred embodiment of the present invention by referring to the appended drawings, in which.

DETAILED DESCRIPTION OF THE PREFERRED EMBODIMENTS

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 1A:
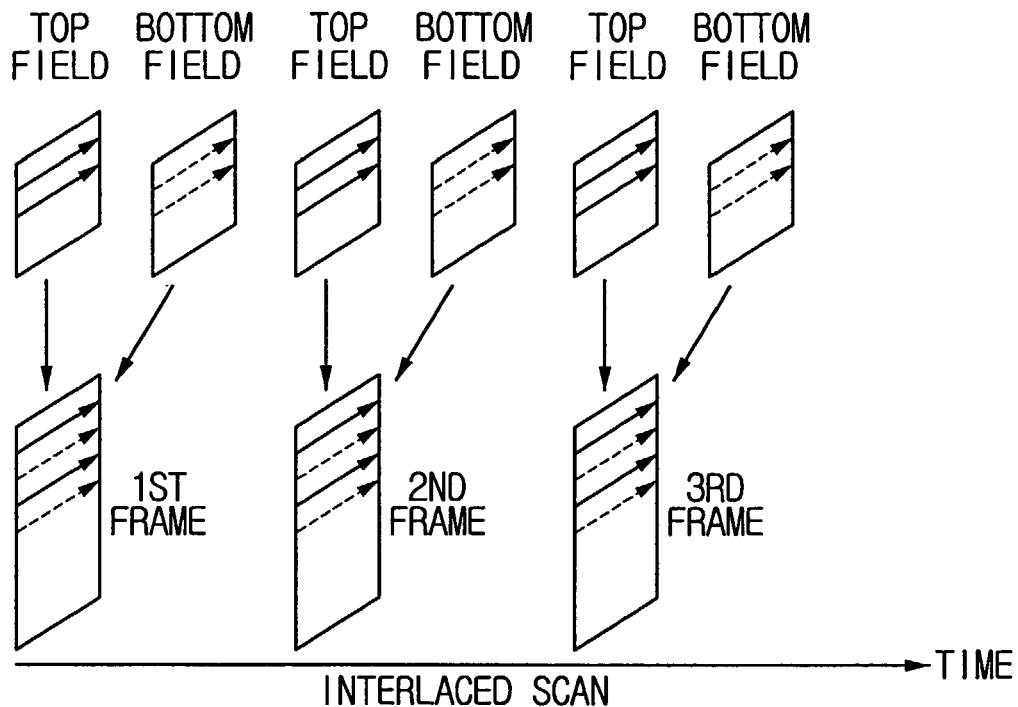
FIG. 1A is a view showing a conventional interlaced scan method.
Figure 1B:
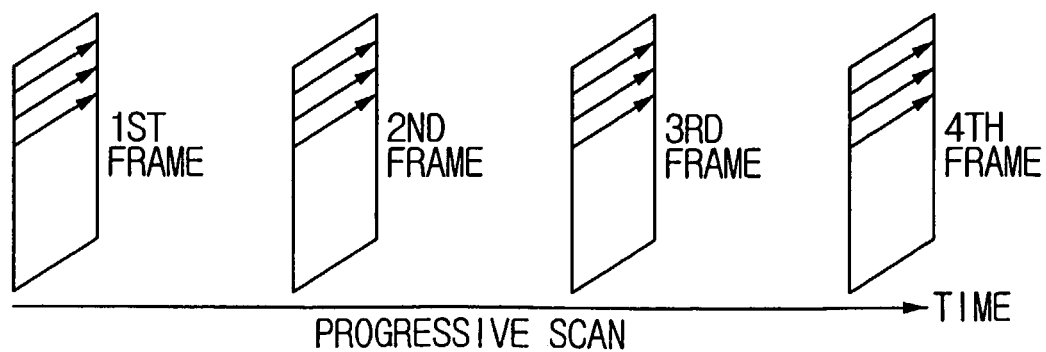
FIG. 1B is a view showing a conventional progressive scan method.
Figure 2:
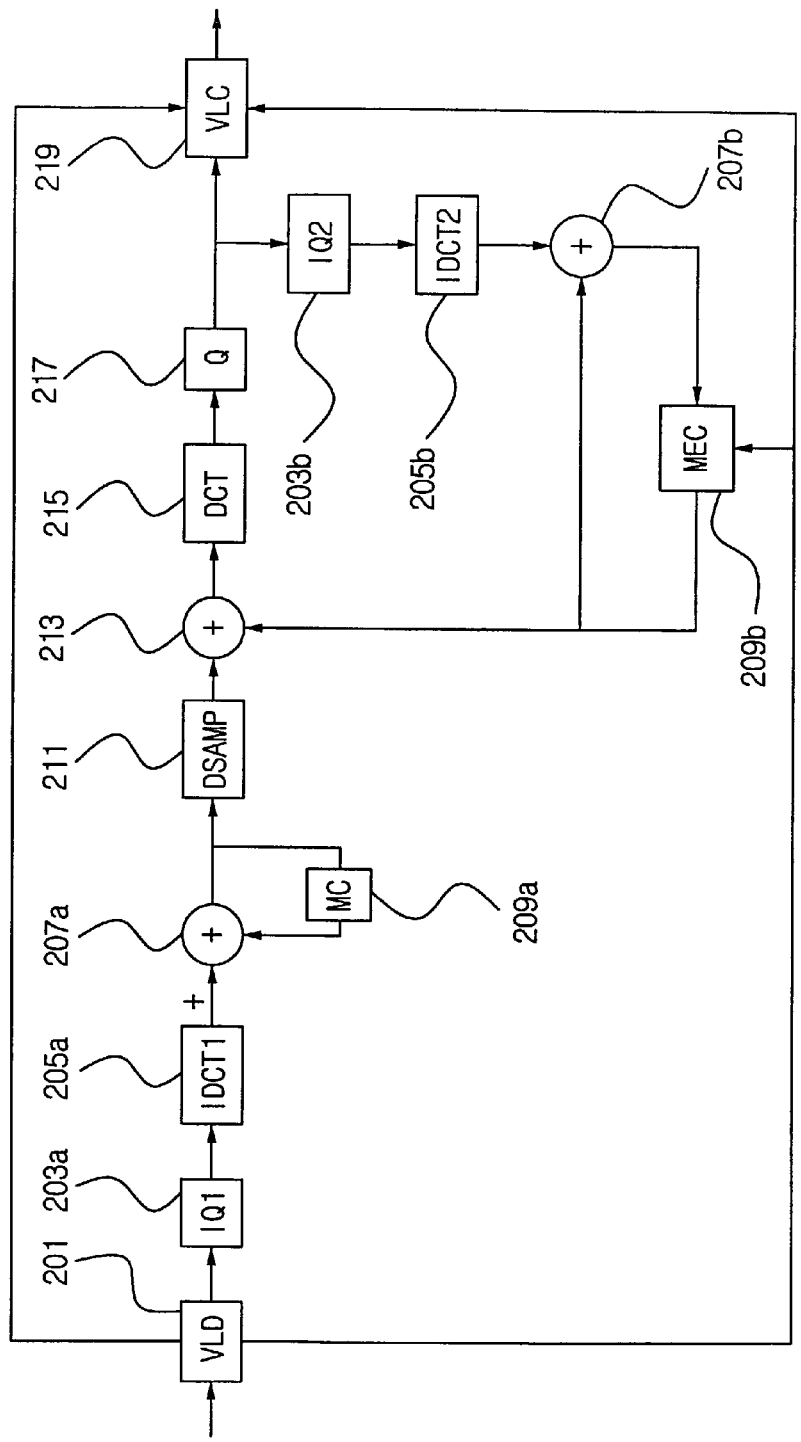
FIG. 2 is a view showing a conventional transcoder.
Figure 3:
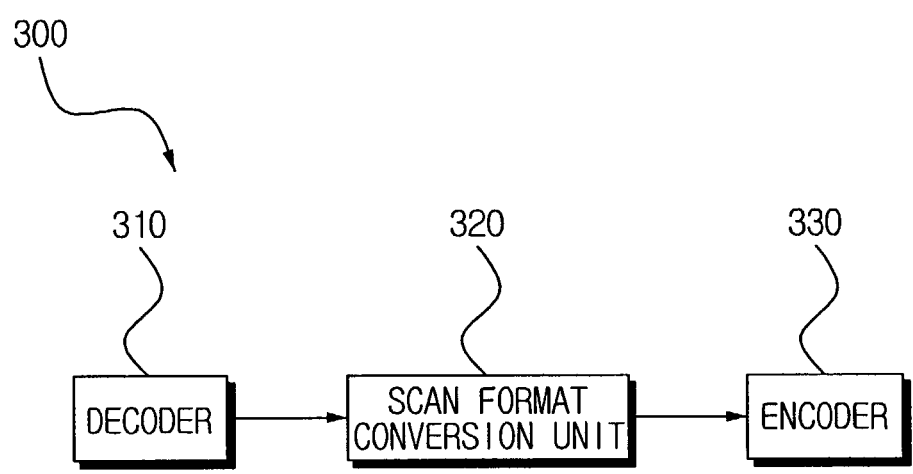
FIG. 3 is a view showing a basic structure of a transcoder according to an embodiment of the present invention.
Figure 4:
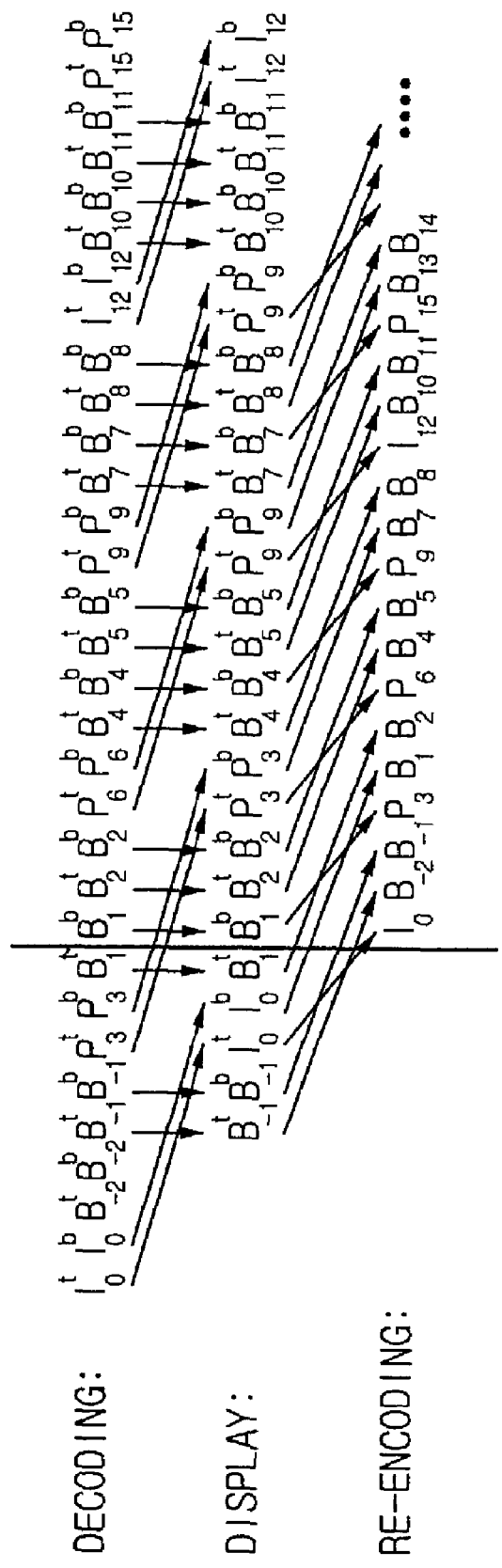
FIG. 4 is a view showing an example of decoding and re-encoding of an image frame in the transcoder according to an embodiment of the present invention.

FIG. 3 is a block diagram showing a basic structure of a transcoder having an apparatus to motion estimate and mode decision according an embodiment of to the present invention. FIG. 4 is a block diagram showing a detailed structure of the apparatus to motion estimate and mode decision according to an embodiment of the present invention.

Referring to FIG. 3, the transcoder 300 has a scan format conversion unit 320 between a decoder 310 and an encoder 330. The transcoder 300 of the present invention supports 18 types of ATSC DTV including a progressive scan and an interlaced scan. The decoder 310 restores an input image by decoding an input bit stream. When the decoding of the input bit stream is complete, the scan format conversion unit 320 not only down-scales a size of the restored image but also converts the restored image into a scan format by re-encoding the restored image.

For example, when an apparatus to display a ground wave broadcasting of an interlaced type as an image is for a PC, the scan format conversion unit 320 converts the interlaced scan into the progressive scan. Moreover, the scan format conversion unit 320 performs down-scaling of the size of the input image to fit to a size of the PC screen. In other words, the scan format conversion unit 320 includes a down-scaler module, a de-interlaced module, and an interlaced module. The image scaling and the scan format conversion are operated before inputting into the encoder 330. The encoder 330 re-encodes the image down scaled and converted into an original size by the scan format conversion unit 320 with a given bit rate.

An image sequence of an input first macro block is decoded and re-encoded as shown in FIG. 4. A basic processing unit (not shown) in the transcoder 300 considers a case of a sub-Group of Picture (sub-GOP) such as IBBP, PBBI, and PBBP. Hereinbelow, the case of GOP=12 and M (distance between P frames)=3 will be described. Lower-placed numerals are an order of an input image sequence, an upper-placed letter 't' is a top field (top, for example, odd lines), upper-placed letter 'b' is a bottom field (bottom, for example, even lines), I, B and P are image frames, and arrows show correlations between the frames. Decoding of the decoder 310 is operated as shown in FIG. 4. The scan format conversion unit 320 changes the sizes of the decoded images, and converts the changed images into the progressive scan (or interlaced scan). The changed images are input into the encoder 330 in the coding order.

Referring to FIG. 4, the scan format conversion unit 320 decodes up to at least $B_2^b$ frame to create a candidate vector group of each macro block with respect to all macro blocks in the first sub-GOP excluding a first I frame. The first I frame is excluded because the first I frame does not need to estimate the motion. On the other hand, a first frame that is needed to estimate the motion is $P_3$ except $B_{-2}$ and $B_{-1}$. A fastest time to start coding is a time when $B_1^b$ is decoded because a candidate vector group generated from a first sub-GOP is used from the time of encoding $P_3$.

Hereinbelow, an example of de-interlacing to convert the input image of the interlaced scan into the image of the progressive scan will be described.

Figure 5:
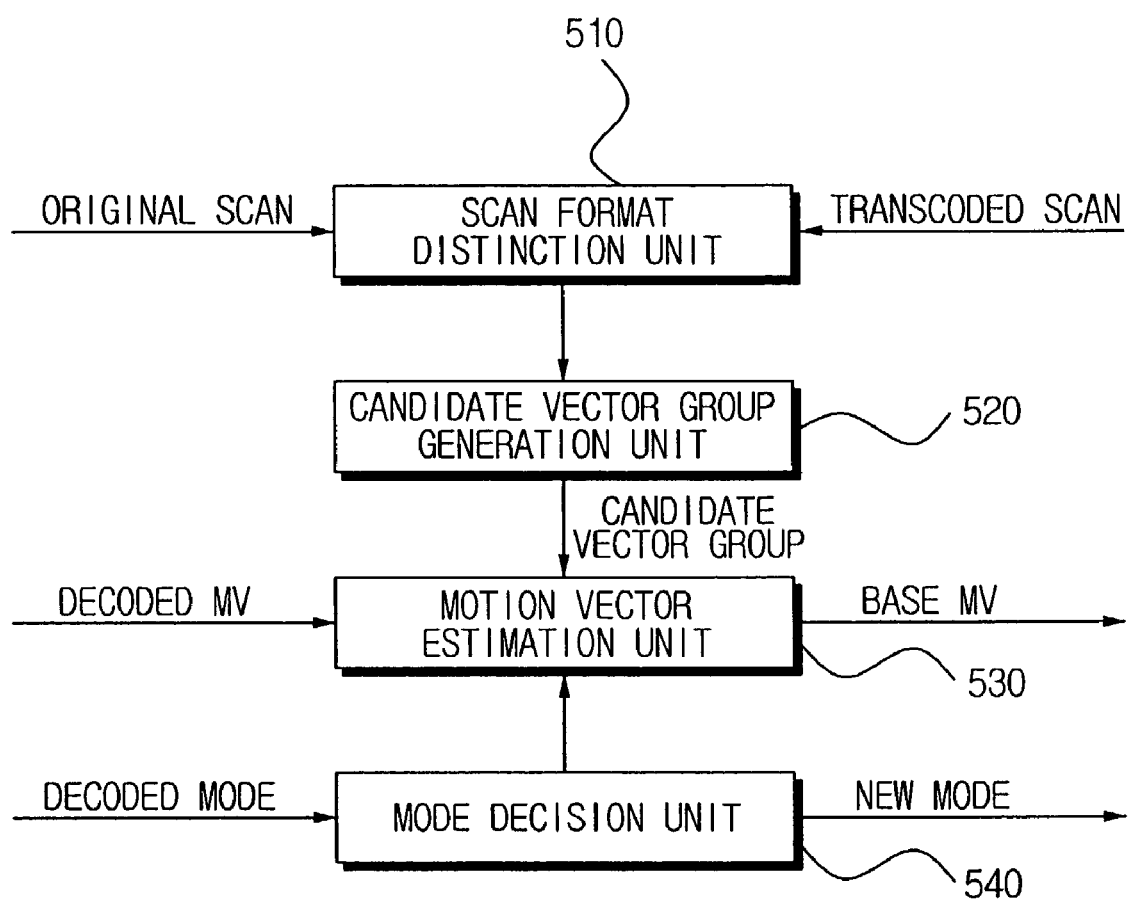
FIG. 5 is a block diagram showing a basic structure of a motion estimation/compensation apparatus according to an embodiment of the present invention.

The encoder 330 has a motion estimation/compensation unit 500 shown in FIG. 5. The motion estimation/compensation unit 500 is to estimate the motion and decide the mode of an image. The motion estimation/compensation unit 500 estimates and compensates a motion vector of a macro block of a new image by using the motion vector and the mode information of each of the macro blocks decoded by the decoder 310.

Referring to FIG. 5, the motion estimation/compensation unit 500 has a scan format distinction unit 510, a candidate vector group generation unit 520, a motion vector estimation unit 530, and a mode decision unit 540. The scan format distinction unit 510 compares the scan format of an input image and the scan format of an output image. The input image is an image before the scaling process, and the output image is an image after the scaling process. When the scan format of the input image and the output image are the same, the motion estimation/compensation unit 500 estimates the motion by using a decoded motion vector without generating the candidate vector group to estimate the motion. On the other hand, when the scan formats of the input image and the output image are different, the motion estimation/compensation unit 500 estimates the motion by generating the candidate vector group.

The candidate vector group generation unit 520 generates a candidate vector group including motion vectors of an adjacent image, which cross the first macro block. Here, the adjacent image exists in a same sub-GOP as the image in which the first macro block of the image before scaling is included.

Figure 6:
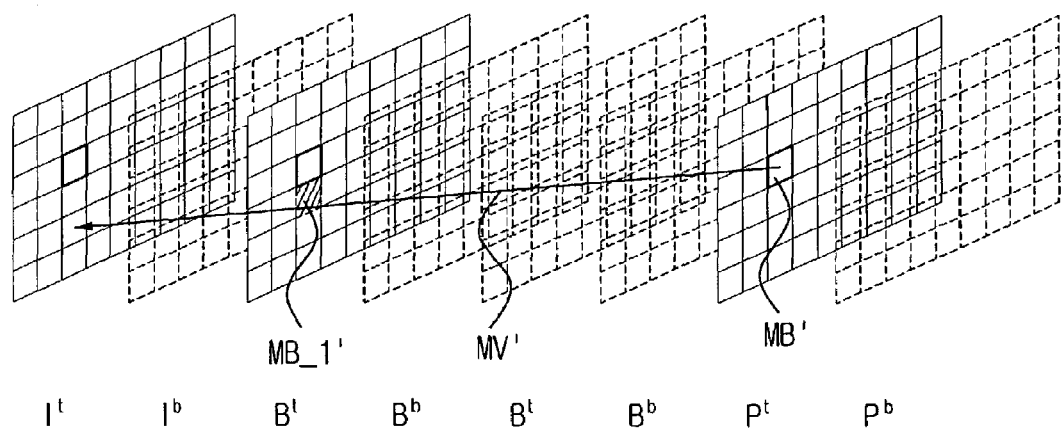
FIG. 6 is a view showing an example to determine a candidate vector group corresponding to a macro block in a sub-GOP according to an embodiment of the present invention.
Figure 7:
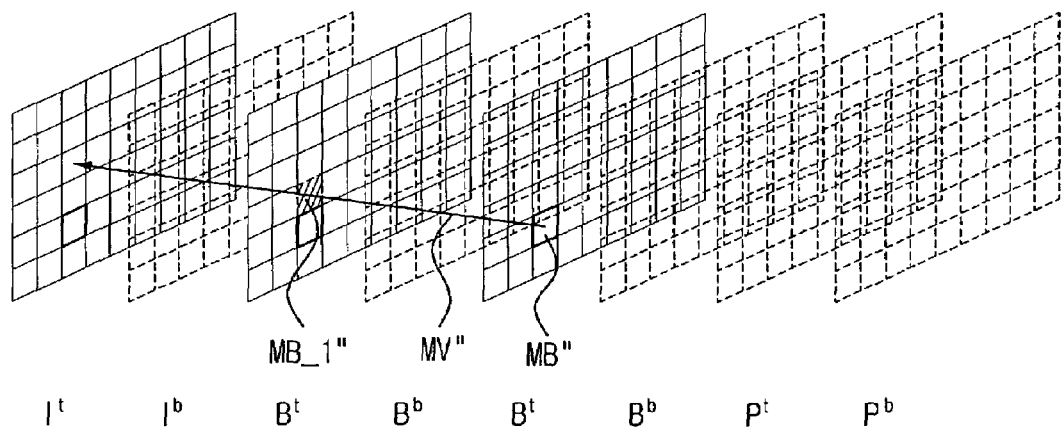
FIG. 7 is a view showing an example to determine the candidate vector group corresponding to the macro block in the sub-GOP according to an embodiment of the present invention.

FIGS. 6 and 7 are views showing examples to determine a candidate vector group corresponding to each of the macro blocks in a certain sub-GOP according to an embodiment of the present invention. Referring to FIG. 6, the macro block marked with diagonal lines in the first $B_t$ frame is called a first macro block (MB1'). Hereinbelow, the candidate vector group generation process of the first macro block (MB_1') will be described.

In FIG. 6, the macro blocks (MB') marked with a thick boundary are the macro blocks at the same position. When a motion vector (MV') of one macro block of $P_t$ frame crosses the first macro block (MB_1'), a corresponding motion vector (MV') becomes a candidate vector of the first macro block (MB_1').

In FIG. 7, when the motion vector (MV") of one macro block (MB") of the second $B_t$ frame crosses the first macro block (MB_1"), the motion vector (MV") becomes a candidate vector of the first macro block (MB_1"). In other words, among motion vectors of all the macro blocks in the sub-GOP, the motion vectors crossing the first macro block constitute the candidate vector group. By the method described above, the candidate vector group with respect to each of the macro blocks to perform the transcoding is generated. However, the candidate vector group according to the macro block may not exist. That is, when the scan format of the input image and the output image are determined as the same by the scan format distinction unit 510, the candidate vector group generation unit 520 does not generate the candidate vector group.

Figure 8:
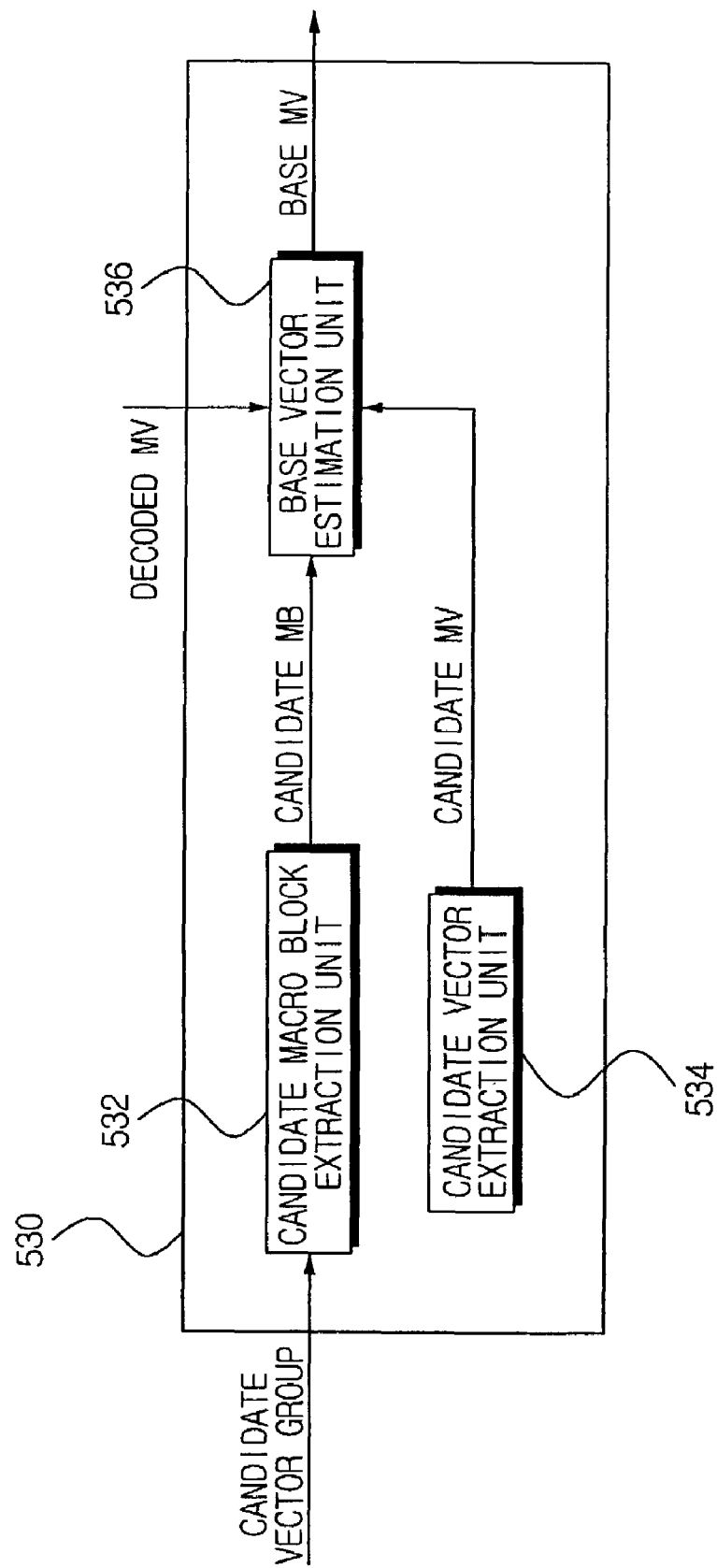
FIG. 8 is a block diagram showing a detailed structure of a motion vector estimation unit according to an embodiment of the present invention.

FIG. 8 is a block diagram showing a detailed structure of the motion vector estimation unit 530 according to an embodiment of the present invention. The motion vector estimation unit 530 has a candidate macro block extraction unit 532, a candidate vector extraction unit 534, and a base vector estimation unit 536.

The motion vector estimation unit 530 estimates a base vector of a second macro block (MB_0), which is a macro block of the image after scaling, from the motion vector and the candidate vector group of the macro blocks (MB_1) overlapped with the second macro block (MB_0).

The size of the motion vector of the macro block before scaling is changed in accordance with a changed size of the screen after scaling, i.e., in accordance with a scaling rate. When the size of the screen is reduced by a given rate, the second macro block (MB_0) of the image input into the encoder 330 includes one or more of macro blocks (MB_1, MB_2, MB_3, MB_4) of the image output from the decoder 310 as shown in FIG. 9.

Figure 9:
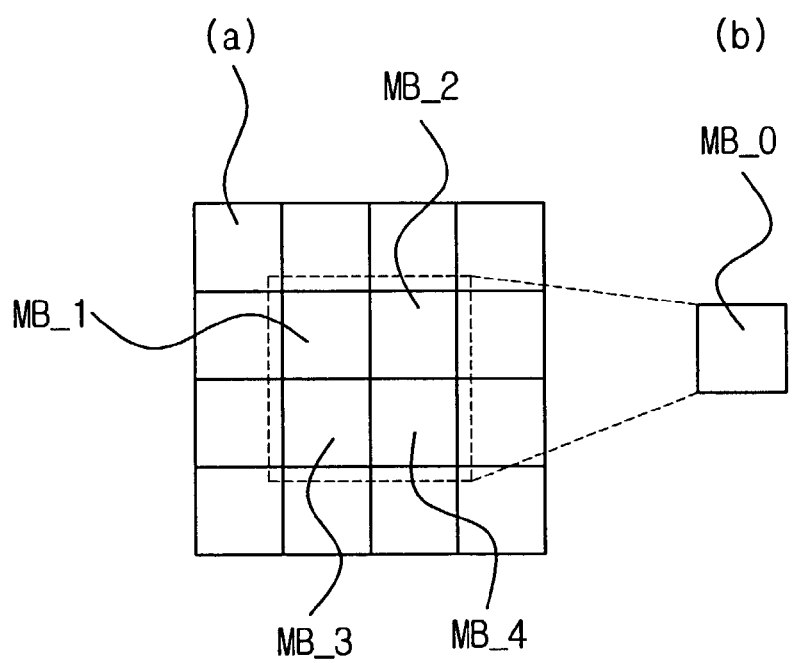
FIG. 9 is a view showing a size change between images before and after scaling.

FIG. 9 is a view showing a size change between the images before and after scaling. Referring to FIG. 9, (a) is the image (original resolution) before scaling and (b) is some part of the image (scaled resolution) after scaling. In FIG. 9, a block in a dotted line of (a) is a block corresponding to the second macro block (MB_0). However, only macro blocks (MB_1, MB_2, MB_3, MB_4) having the size of 16×16 among the blocks in the dotted line are considered for the motion estimation. In other words, FIG. 9 shows a case of motion estimation considering four macro blocks output from the decoder 310 per one macro block at the encoder 330. In other words, the second macro block (MB_0) considers motion vector and a candidate vector group as many times as the number of the macro blocks (MB_1, MB_2, MB_3, MB_4). The motion of the second macro block (MB_0) is estimated with the decoded motion vector of each of the macro blocks (MB_1, MB_2, MB_3, MB_4) and the candidate vector group of each of the macro blocks (MB_1, MB_2, MB_3, MB_4) taken into consideration.

As one example of the motion estimation, the motion vector estimation unit 530 calculates a SAD (sum of absolute difference) according to the decoded motion vector of each of the macro blocks (MB_1, MB_2, MB_3, MB_4) and the candidate vector group of each of the macro blocks (MB_1, MB_2, MB_3, MB_4). The motion vector having the minimum value of SAD is estimated to be the base vector of the second macro block (MB_0). SAD is calculated by the following mathematical expression.

$$SAD = \Sigma |x(i, j) - x'(i+x, j+y)|$$

A macro block includes 256 pixels (16×16). 'x(i, j)' is a pixel at (i, j) shown by the motion vector of a current macro block, and 'x' (i+x, j+y)' is a pixel at (i+x, j+y) shown by the motion vector (x, y) of a reverse frame. In other words, SAD is calculated by adding absolute values after obtaining the absolute values of a difference of the pixels existed at the same position in two macro blocks. As the SAD is less, two macro blocks become similar, and as the SAD is greater, two macro blocks become different.

Here, the 'current macro block' is the macro block to be scaled, which is intermediate between the first macro block and the second macro block in terms of time sequence. As described above, as the candidate vector group of each of the macro blocks (MB_1, MB_2, MB_3, MB_4) overlapped with the second macro block (MB_0) is obtained, and the SAD of the motion vector and the candidate vector group of each of the macro blocks (MB_1, MB_2, MB_3, MB_4) are compared, a more accurate and clearer edges and images can be displayed on the screen.

As another example of the motion estimation, high velocity motion estimation of the base vector, in other words, the motion vector of the second macro block (MB_0) can be obtained with fast and with less computations by selecting one macro block among the macro blocks (MB_1, MB_2, MB_3, MB_4), each macro block being overlapped with the second macro block (MB_0).

Hereinbelow, the high velocity motion estimation for estimating the base vector after extracting the candidate macro block will be described. The candidate macro block extraction unit 532 selects one macro block from the macro blocks (MB_1, MB_2, MB_3, MB_4) overlapped with the second macro block (MB_0), and calculates a first median value of the decoded motion vector for each of the macro blocks (MB_1, MB_2, MB_3, MB_4). Then, the candidate macro block extraction unit 532 extracts a macro block having a motion vector closest to the calculated first median value from each of the macro blocks (MB_1, MB_2, MB_3, MB_4), and designates the extracted macro block as a candidate macro block. For example, when the motion vector closest to the first median value is positioned at the macro block (MB_3), the candidate macro block extraction unit 532 designates the macro block (MB_3) as the candidate macro block.

The base vector estimation unit 536 obtains the SAD corresponding to the candidate vector group of the candidate macro block (MB_3) generated from the candidate vector group generation unit 520 and the decoded motion vector of the candidate macro block (MB_3). Moreover, a motion vector having the minimum value of SAD is estimated to be the base vector of the second macro block (MB_0).

As another example of motion estimation, the motion vector estimation unit 530 calculates a median value or an average value corresponding to the decoded motion vectors of the respective macro blocks (MB_1, MB_2, MB_3, MB_4) and the candidate vector group of the macro blocks (MB_1, MB_2, MB_3, MB_4). Then the motion vector estimation unit 530 estimates the motion vector containing the calculated median or the average value as the base vector of the second macro block (MB_0). In this case, the base vector estimation unit 536 calculates a median value or an average value corresponding to the candidate vector group of the candidate macro block (MB_3) generated at the candidate vector group generation unit 520 and the decoded motion vector of the candidate macro block (MB_3). Then, the motion vector having the calculated median or average value is estimated as the base vector of the second macro block (MB_0).

A mode decision unit 540 decides a mode of the second macro block (MB_0) from the base vector estimated at the base vector estimation unit 536 and a mode of each of the macro blocks (MB_1, MB_2, MB_3, MB_4).

The mode decision unit 540 decides the second macro block (MB_0) as an intra mode, where intra mode occurs when a portion, that is, more than 25% of each of the macro blocks (MB_1, MB_2, MB_3, MB_4) overlaps with the second macro block (MB_0). Otherwise, the second macro block (MB_0) is decided as an inter mode and the motion estimation is performed. In the meantime, the mode decision unit 540 decides the second macro block (MB_0) as the inter mode, when at least one macro block among the macro blocks (MB_1, MB_2, MB_3, MB_4) is a skipped type macro block. Furthermore, the mode decision unit 540 decides the second macro block (MB_0) as the skipped macro block, when all the macro blocks (MB_1, MB_2, MB_3, MB_4) are the skipped type macro blocks.

Further, the mode decision of the case not adapting the high velocity motion estimation is as follows. When there is no need for the candidate vector group, according to the conversion type of the frame or picture type (I, B and P), the mode decision unit 540 decides the second macro block (MB_0) after scaling as the intra mode. For example, when the B frame is converted into the I frame, the second macro block (MB_0) after scaling is decided as the intra mode. In addition, when the decoded mode of each of the macro blocks (MB_1, MB_2, MB_3, MB_4) before scaling is the intra mode, the mode decision unit 540 decides the second macro block (MB_0) after scaling as the intra mode regardless of the candidate vector group.

Figure 10:
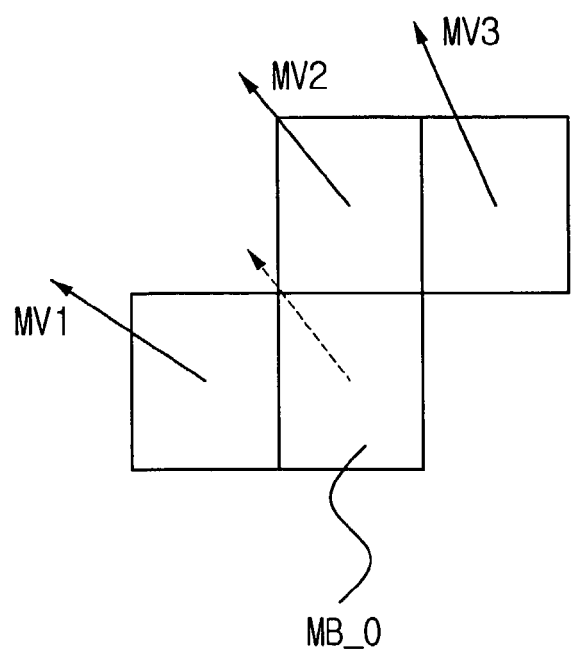
FIG. 10 is a view illustrating setting up a base vector when there is no candidate vector group.

FIG. 10 is a view illustrating setting up a base vector when there is no candidate vector group. In some cases, the second macro block (MB_0) is in the inter mode, and there is no candidate vector group at each of the macro blocks (MB_1, MB 2, MB_3, MB_4) overlapped with the second macro block (MB_0). For example, when the second macro block (MB_0) indicates a boundary, or when the neighboring macro blocks (MB_1, MB_2, MB_3, MB_4) are in the intra mode, there is no candidate vector group. In this case, the motion vector estimation unit 530 further has the candidate vector extraction unit 534 as shown in FIG. 8.

Referring to FIG. 10, the candidate vector extraction unit 534 extracts the candidate vector from the motion vector (MV1, MV2, and MV3) of one or more neighboring macro blocks adjacent to the second macro block (MB_0). The candidate vector extraction unit 534 uses the median value or the average value of the motion vector (MV1, MV2 and MV3) of the adjacent macro blocks as the candidate vector of the second macro block (MB_0). The base vector estimation unit 536 calculates the SAD according to the candidate vector and the motion vector of each of the macro blocks (MB_1, MB_2, MB_3, MB_4) overlapped with the second macro block (MB_0) using the mathematical expression 1 shown above. Additionally, the motion vector having the minimum value of SAD is estimated to be the base vector of the second macro block (MB_0).

Furthermore, when there are no macro blocks adjacent to the second macro block (MB_0), the base vector estimation unit 536 calculates the SAD according to the motion vector of each of macro blocks (MB_1, MB_2, MB_3, MB_4) and the motion vector (0, 0) using the mathematical expression 1 shown above. Moreover, the motion vector having the minimum value of SAD is estimated to be the base vector of the second macro block (MB_0).

Figure 11:
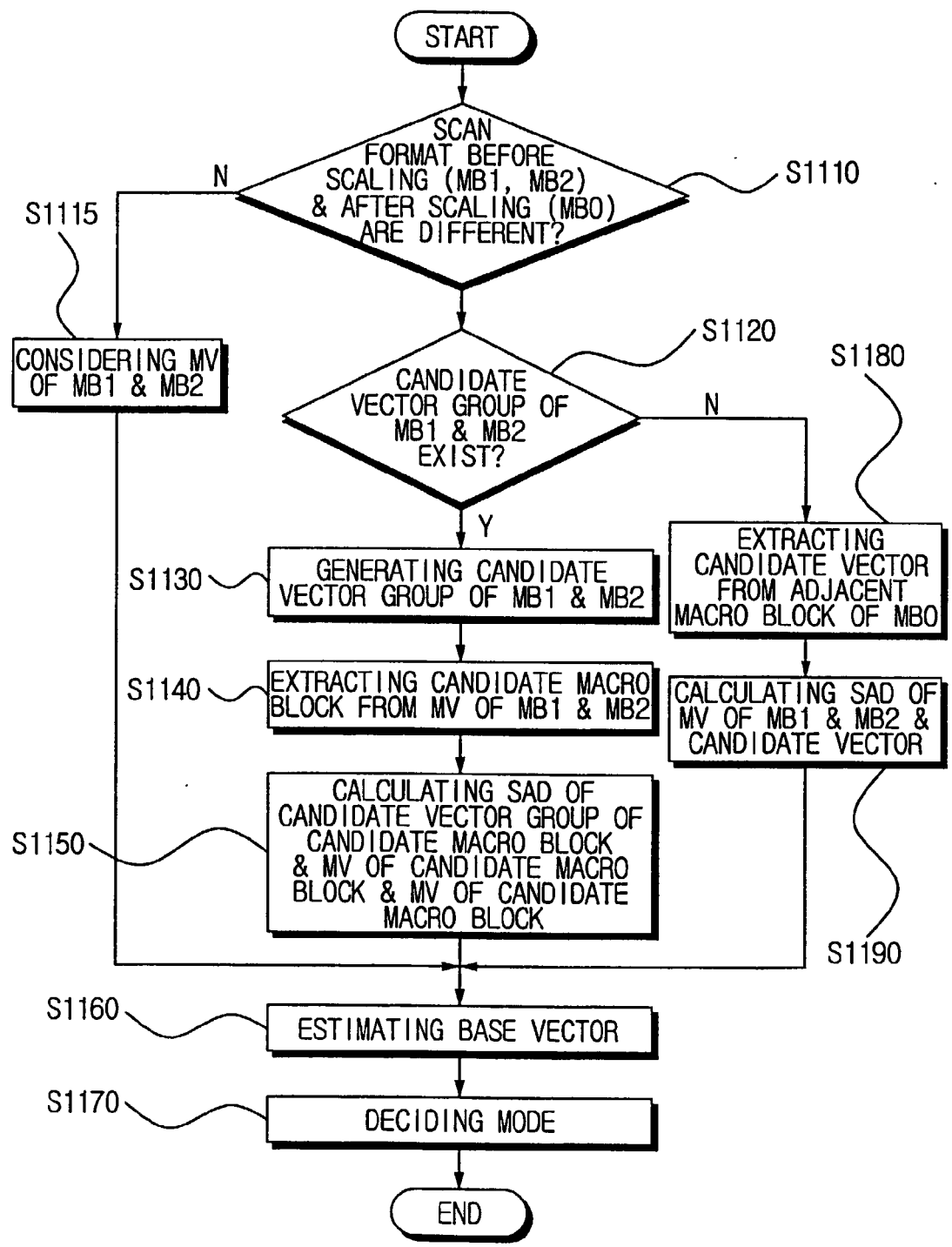
FIG. 11 is a flow chart showing a method, according to an embodiment of the present invention, of estimating a motion and determining a mode.

FIG. 11 is a flow chart showing a method to estimate the motion and decide the mode according to an embodiment of the present invention. In FIG. 11, the first macro block of the image before scaling is referred to as MB_1 and MB_2, and the second macro block of the image after scaling is referred to as MB_0. Referring to FIG. 11, the method, at S1110, compares the scan format of MB_1, MB_2 and MB_0. At S1120, when two scan formats are different, a determination is made as to whether motion vectors exist crossing MB_1 and MB_2 among the motion vectors of the adjacent image in the sub-GOP. Furthermore, at S1130, the candidate vector group of MB_1 and MB_2 are generated with the motion vectors crossing MB_1 and MB_2. After the candidate vector group of MB_1 and MB_2 are generated, a first median value of the decode motion vectors of MB_1 and MB_2 is calculated to estimate the motion at the high velocity. In addition, at S1140, the candidate macro block is extracted by selecting the macro block having the motion vector close to the calculated first median value between MB_1 and MB_2. Then, at S1150, the SAD according to the candidate vector group of the extracted candidate macro block and the motion vector, or the median value, or the average value is obtained. In an exemplary embodiment of the present invention, the base vector may be obtained by using the SAD. The SAD is calculated using the mathematical expression 1 described above. At S1160, the motion vector having the minimum value of SAD is estimated to be the base vector of MB_0, after the SAD of each of the obtained motion vectors are compared with each other. Finally, at S1170, the mode of MB_0 is determined from the base mode of MB_0 and the mode of MB_1 and MB_2.

Moreover, at S1120, when there are no motion vectors crossing MB_1 and MB_2 among the motion vectors of the adjacent image in the sub-GOP and the same as the image including MB_1 and MB_2, at S1180, the candidate motion vector is extracted from the motion vectors of the macro blocks close to MB_0. The candidate motion vector uses the median value or the average value of each of the motion vectors. Additionally, at S1190, the SAD, according to the extracted candidate motion vector and the motion vector of MB_1 and MB_2 is calculated using the mathematical expression 1 described above. At S1170, the mode is determined after estimating the motion vector having the minimum value of SAD to be the base vector of MB_0 at S1160.

Furthermore, at S1110, when two scan formats are determined to be the same, at S1115, only the decoded motion vectors of MB_1 and MB_2 are considered. Subsequently, at S1160, the base vector of MB_0 is estimated and, at S1170, the mode is decided.

Figures 12A, 12B:
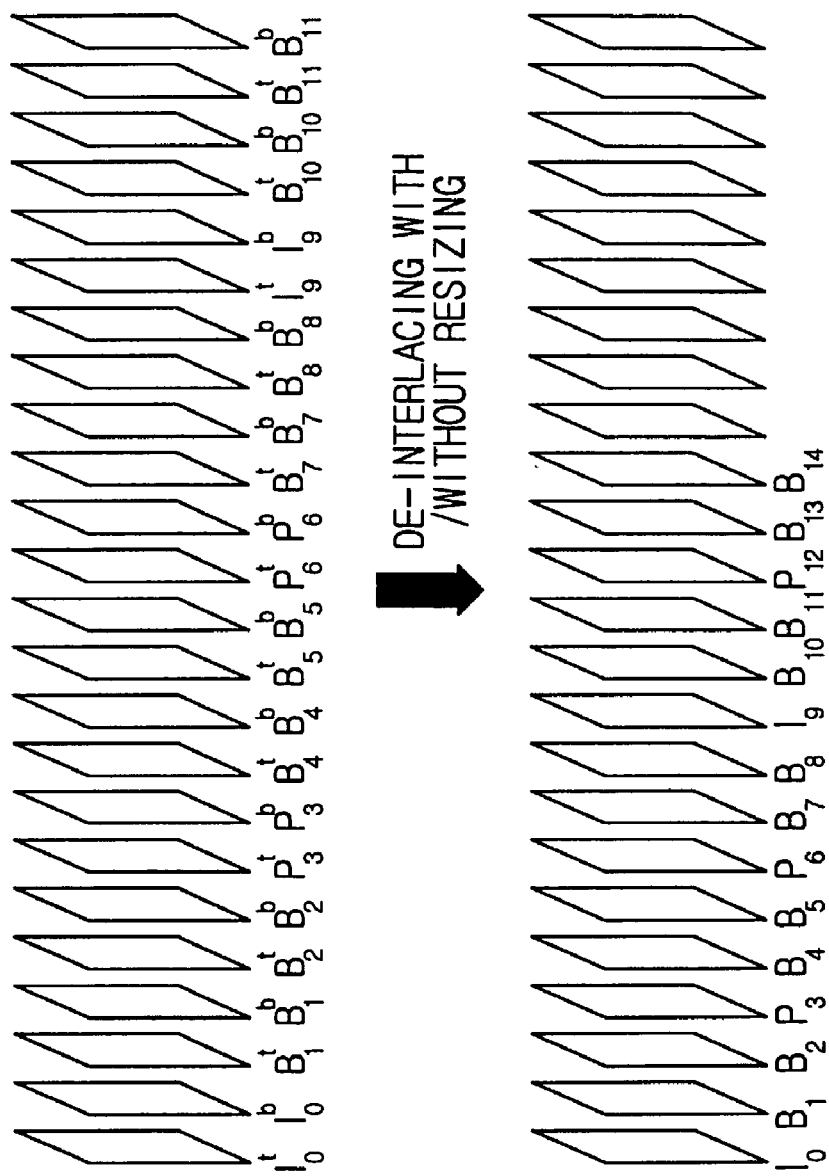
FIG. 12A is a view showing an interlaced image.
FIG. 12B is a view showing the macro blocks of the interlaced image converted into a progressive image using motion estimation and mode decision according to an embodiment of the present invention.

FIGS. 12A and 12B are views showing an example of the motion estimation and the mode decision according to an embodiment of the present invention. 'GOP'=9, 'M'=3, 'I, B, P' are picture type before and after scan format conversion, 't' is a top field, 'b' is a bottom field, each numeral is the frame number, a numeral in a circle is the order of re-encoding, and a case of de-interlacing is considered. At this time, the size of the screen may or may not be changed. In addition, the motion estimation considers only a case that the decoded mode is the inter mode. Hereinbelow, cases will be described on how each of the macro blocks of the interlaced image as shown FIG. 12A is adapted after being converted into the progressive image as shown FIG. 12B. Furthermore, the macro block before scaling is marked as MB_b, the macro block after scaling is marked as MB_n, and the motion vector is marked as MV.

Case 1: when $I_0{}^t$ frame corresponds to $I_0$ frame, the modes of all MB_n are the intra modes.

Case 2: first, when $B_1{}^b$ frame corresponds to $P_3$ frame and the decoded mode of MB_b is a forward MC mode, the candidate vector group of MB_b includes the decoded motion vectors of MB_b and forward motion vectors among the motion vectors crossing MB_b. Moreover, the base vector is determined by using the above-described method (for example, high velocity estimation using a median value) using the obtained candidate vector group. Second, when the decoded mode of MB_b is a reverse MC mode, the candidate vector group of MB_b includes the forward motion vectors among the motion vectors crossing MB_b. Furthermore, the base vector is decided by using the above-described method using the obtained candidate vector group. Third, when the decoded mode is a bi-directional MC mode, the candidate vector group of MB_b includes the reverse motion vectors among the motion vectors of MB_b and the forward motion vectors among the motion vectors crossing MB_b. In addition, the base vector is determined by using the method of FIG. 11 using the obtained candidate vector group.

Case 3: when $I_0{}^b$ frame corresponds to $B_1$ frame, the candidate vector group of MB_b includes the reverse/forward motion vectors among the motion vectors crossing MB_b. Further, the base vector and the reverse/forward/bi-directional MC mode are simultaneously determined by using the above-described method by the obtained candidate vector group.

Case 4: first, when $B_1{}^t$ frame corresponds to $B_2$ frame and the decoded mode of MB_b is the forward MC mode, the candidate vector group of MB_b includes reverse/forward motion vectors among the motion vectors crossing MB_b and the forward motion vectors of the decoded motion vectors of MB_b. Additionally, the base vector and reverse/forward/bi-directional MC modes are determined by using the obtained candidate vector group. Second, when the decoded mode of MB-b is the reverse MC mode, the candidate vector group of MB_b includes the reverse/forward motion vectors among the motion vectors crossing MB_b and the reverse motion vectors of the decoded motion vectors of MB_b. Furthermore, the base vector and the reverse/forward/bi-directional MC modes are determined by using the obtained candidate vector group. Third, when the decoded mode is the bi-directional MC mode, the candidate vector group of MB_b includes the reverse/forward motion vectors among the motion vectors crossing MB_b and the reverse/forward motion vectors among the motion vectors of MB_b. After that, the base vector and the reverse/forward/bi-directional MC modes are determined by using the obtained candidate vector group.

Case 5: when $P_3{}^t$ frame corresponds to $P_6$ frame, the candidate vector group of MB_b includes the forward motion vectors among the motion vectors crossing MB_b and the motion vectors of MB_b. The base vector is determined by using the obtained candidate vector group.

Case 6: when $B_2^t$ frame corresponds to $B_4$ frame, it is the same case as case 4.

Case 7: when $B_2^b$ frame corresponds to $B_5$ frame, it is the same case as case 4.

Case 8: when $B_4^b$ frame corresponds to $I_9$ frame, all modes of MB_n are the intra mode.

Case 9: when $P_3^b$ frame corresponds to $B_7$ frame, the candidate vector group of MB_b includes the reverse/forward motion vectors among the motion vectors crossing MB_b and the motion vectors of MB_b. The base vector and the reverse/forward/bi-directional MC modes are determined by using the obtained candidate vector group.

Case 10: when $B_4^t$ frame corresponds to $B_8$ frame, it is the same case as case 4.

According to the apparatus and the method to estimate the motion decide the mode, a re-compression function does not deteriorate and a speed of re-encoding can be improved, when the scan format is converted from the interlaced scan into the progressive scan or from the progressive scan into the interlaced scan. Moreover, as the motion of the scan format converted image can be estimated by generating the candidate vector group in a decoded motion vector, the motion can be estimated with less number of computations. Furthermore, according to an embodiment of the present invention, the transcoding capable of supporting 18 types of ATSC DTV format becomes available.

Although the preferred embodiments of the present invention have been described, it will be understood by those skilled in the art that the present invention should not be limited to the described preferred embodiment, but various changes and modifications can be made within the spirit and the scope of the present invention. Accordingly, the scope of the present invention is not limited within the described range but the following claims.

What is claimed is:

1. An apparatus of motion estimation and mode decision, comprising:
   a candidate vector group generation unit generating a candidate vector group comprising a motion vector of an adjacent image crossing a first macro block, wherein the first macro block is a macro block of an image before scaling, and the first macro block and the adjacent image exist in a same sub-group of a picture (sub-GOP);
   a motion vector estimation unit estimating a base vector of a second macro block from the motion vector and the candidate vector group of the first macro block overlapped with the second macro block, wherein the second macro block is a macro block of the image after scaling; and
   a mode decision unit determining a mode of the second macro block from the estimated base vector and a mode of the first macro block,
   wherein, in accordance with a type of the image, the motion vector estimation unit calculates a sum of an absolute difference (SAD) according to the motion vector and the candidate vector group of the first macro block overlapped with the second macro block, and estimates a motion vector having a minimum SAD to be the base vector of the second macro block, and
   wherein the mode decision unit determines the second macro block to be an intra mode when a portion of the intra mode in the first macro block overlapped with the second macro block is above a predetermined value, and determines the second macro block to be an inter mode when the portion of the intra mode in the first macro block overlapped with the second macro block is below the predetermined value.

2. The apparatus of claim 1, wherein the motion vector estimation unit comprises:
   a candidate macro block extraction unit calculating a first median value from the motion vector of the first macro block overlapped with the second macro block, and extracting from the first macro block overlapped with the second macro block a candidate macro block having a motion vector close to the first median value; and
   a base vector estimation unit calculating the SAD according to the motion vector and a candidate vector group of the extracted candidate macro block, and estimating the motion vector having the minimum value of the SAD to be the base vector of the second macro block.

3. The apparatus of claim 1, wherein, in accordance with a type of the image, the motion vector estimation unit calculates a median value or an average value according to the motion vector and the candidate vector group of the first macro block overlapped with the second macro block, and estimates the calculated value as a base vector.

4. The apparatus of claim 3, wherein the motion vector estimation unit comprises:
   a candidate macro block extraction unit obtaining a first median value from the motion vector of the first macro block overlapped with the second macro block, and extracting from the first macro block overlapped with the second macro block, a candidate macro block having a motion vector close to the first median value; and
   a base vector estimation unit calculating either the median value or the average value according to the motion vector and the candidate vector group of the extracted candidate macro block, and estimating the calculated value to be a base vector of the second macro block.

5. The apparatus of claim 1, wherein, when the second macro block is determined to be the inter mode and there is no candidate vector group of the first macro block,
   the motion vector estimation unit comprises:
   a candidate vector extraction unit calculating a candidate vector from motion vectors of one or more adjacent macro blocks close to the second macro block; and
   a base vector estimation unit estimating a motion vector having the minimum value of SAD to be the base vector of the second macro block by comparing the SAD according to the extracted candidate vector and the motion vector of the first macro block overlapped with the second macro block.

6. The apparatus of claim 5, wherein the candidate vector is a median value and/or an average value of the motion vector of one or more of the adjacent macro blocks.

7. The apparatus of claim 5, wherein, when the adjacent macro blocks are not close to the second macro block, the motion vector estimation unit decides the motion vector having the minimum value of SAD to be the base vector of the second macro block by comparing the SAD according to the motion vector of the first macro block overlapped with the second macro block.

8. The apparatus of claim 1, wherein the mode decision unit determines the mode of the second macro block to be an intra mode when the mode of the first macro block overlapped with the second macro block is the intra mode.

9. The apparatus of claim 1, further comprising:
   a scan format distinction unit comparing and determining scan formats of the first macro block and the second macro block.

10. The apparatus of claim 9, wherein the candidate vector group generation unit generates the candidate vector group when the scan formats of the first macro block and the second macro block are different.

11. A method of motion estimation and mode decision, comprising:
generating a candidate vector group comprises a motion vector of an adjacent image crossing a first macro block, the first macro block being a macro block of an image before scaling, and the first macro block and the adjacent image existing in a same sub-group of picture (sub-GOP);
estimating a base vector of a second macro block from the motion vector and the candidate vector group of the first macro block overlapped with the second macro block, wherein the second macro block is a macro block of the image after scaling; and
determining a mode of the second macro block from the estimated base vector and a mode of the first macro block,
wherein, in accordance with a type of the image, the estimating of the base vector comprises calculating a sum of an absolute difference (SAD) according to the motion vector and the candidate vector group of the first macro block overlapped with the second macro block, and estimating a motion vector having a minimum SAD to be the base vector of the second macro block, and
wherein the determining of the mode comprises determining the second macro block to be an intra mode when a portion of the intra mode in the first macro block overlapped with the second macro block is above a predetermined value, and determining the second macro block to be an inter mode when the portion of the intra mode in the first macro block overlapped with the second macro block is below the predetermined value.

12. The method of claim 11, wherein the estimating of the base vector comprises:
calculating a first median value from the motion vector of the first macro block overlapped with the second macro block, and extracting from the first macro block overlapped with the second macro block a candidate macro block having a motion vector close to the first median value; and
calculating the SAD according to the motion vector and a candidate vector group of the extracted candidate macro block, and estimating the motion vector having the minimum value of the SAD to be the base vector of the second macro block.

13. The method of claim 11, wherein, in accordance with a type of the image, the estimating of the base vector comprises calculating a median value or an average value according to the motion vector and the candidate vector group of the first macro block overlapped with the second macro block, and estimating the calculated value as a base vector.

14. The method of claim 13, wherein the estimating of the base vector comprises:
obtaining a first median value from the motion vector of the first macro block overlapped with the second macro block, and extracting from the first macro block overlapped with the second macro block a candidate macro block having a motion vector close to the first median value; and
calculating the median value or the average value according to the motion vector and the candidate vector group of the extracted candidate macro block, and estimating the calculated value to be a base vector of the second macro block.

15. The apparatus of claim 11, wherein, when the second macro block is determined to be the inter mode and there is no candidate vector group of the first macro block,
the estimating of the base vector comprises:
calculating a candidate vector from motion vectors of one or more adjacent macro blocks close to the second macro block; and
estimating a motion vector having the minimum value of SAD to be the base vector of the second macro block by comparing the SAD according to the extracted candidate vector and the motion vector of the first macro block overlapped with the second macro block.

16. The method of claim 15, wherein the candidate vector is a median value and/or an average value of the motion vector of one or more of the adjacent macro blocks.

17. The method of claim 15, wherein, when the adjacent macro blocks are not close to the second macro block,
the estimating of the base vector further comprises determining the motion vector having the minimum value of SAD to be the base vector of the second macro block by comparing the SAD according to the motion vector of the first macro block overlapped with the second macro block.

18. The method of claim 11, wherein the determining of the mode determines the mode of the second macro block to be an intra mode when the mode of the first macro block overlapped with the second macro block is the intra mode.

19. The method of claim 11, further comprising: comparing and determining scan formats of the first macro block and the second macro block.

20. The apparatus of claim 19, wherein the generating of the candidate vector group comprises generating the candidate vector group when the scan formats of the first macro block and the second macro block are different.

21. An apparatus of motion estimation and mode decision, comprising:
a candidate vector group generation unit generating a candidate vector group comprising a motion vector of an adjacent image crossing a first macro block, wherein the first macro block is a macro block of an image before scaling, and the first macro block and the adjacent image exist in a same sub-group of a picture (sub-GOP);
a motion vector estimation unit estimating a base vector of a second macro block from the motion vector and the candidate vector group of the first macro block overlapped with the second macro block, wherein the second macro block is a macro block of the image after scaling; and
a mode decision unit determining a mode of the second macro block from the estimated base vector and a mode of the first macro block,
wherein, in accordance with a type of the image, the motion vector estimation unit calculates a sum of an absolute difference (SAD) according to the motion vector and the candidate vector group of the first macro block overlapped with the second macro block, and estimates a motion vector having a minimum SAD to be the base vector of the second macro block, and
wherein the motion vector estimation unit comprises:
a candidate macro block extraction unit calculating a first median value from the motion vector of the first macro block overlapped with the second macro block, and extracting from the first macro block overlapped with the second macro block a candidate macro block having a motion vector close to the first median value; and a base vector estimation unit calculating the SAD according to the motion vector and a candidate vector group of the extracted candidate macro block, and estimating the motion vector having the minimum value of the SAD to be the base vector of the second macro block.

22. An apparatus of motion estimation and mode decision, comprising:

a candidate vector group generation unit generating a candidate vector group comprising a motion vector of an adjacent image crossing a first macro block, wherein the first macro block is a macro block of an image before scaling, and the first macro block and the adjacent image exist in a same sub-group of a picture (sub-GOP);

a motion vector estimation unit estimating a base vector of a second macro block from the motion vector and the candidate vector group of the first macro block overlapped with the second macro block, wherein the second macro block is a macro block of the image after scaling; and a mode decision unit determining a mode of the second macro block from the estimated base vector and a mode of the first macro block, wherein, in accordance with a type of the image, the motion vector estimation unit calculates a sum of an absolute difference (SAD) according to the motion vector and the candidate vector group of the first macro block overlapped with the second macro block, and estimates a motion vector having a minimum SAD to be the base vector of the second macro block, and wherein the mode decision unit determines the mode of the second macro block to be an intra mode when the mode of the first macro block overlapped with the second macro block is the intra mode.

23. A method of motion estimation and mode decision, comprising:

generating a candidate vector group comprises a motion vector of an adjacent image crossing a first macro block, the first macro block being a macro block of an image before scaling, and the first macro block and the adjacent image existing in a same sub-group of picture (sub-GOP);

estimating a base vector of a second macro block from the motion vector and the candidate vector group of the first macro block overlapped with the second macro block, wherein the second macro block is a macro block of the image after scaling; and determining a mode of the second macro block from the estimated base vector and a mode of the first macro block, wherein, in accordance with a type of the image, the estimating of the base vector comprises calculating a sum of an absolute difference (SAD) according to the motion vector and the candidate vector group of the first macro block overlapped with the second macro block, and estimating a motion vector having a minimum SAD to be the base vector of the second macro block, and wherein the estimating of the base vector comprises:

calculating a first median value from the motion vector of the first macro block overlapped with the second macro block, and extracting from the first macro block overlapped with the second macro block a candidate macro block having a motion vector close to the first median value; and calculating the SAD according to the motion vector and a candidate vector group of the extracted candidate macro block, and estimating the motion vector having the minimum value of the SAD to be the base vector of the second macro block.

24. A method of motion estimation and mode decision, comprising:

generating a candidate vector group comprises a motion vector of an adjacent image crossing a first macro block, the first macro block being a macro block of an image before scaling, and the first macro block and the adjacent image existing in a same sub-group of picture (sub-GOP);

estimating a base vector of a second macro block from the motion vector and the candidate vector group of the first macro block overlapped with the second macro block, wherein the second macro block is a macro block of the image after scaling; and determining a mode of the second macro block from the estimated base vector and a mode of the first macro block, wherein, in accordance with a type of the image, the estimating of the base vector comprises calculating a sum of an absolute difference (SAD) according to the motion vector and the candidate vector group of the first macro block overlapped with the second macro block, and estimating a motion vector having a minimum SAD to be the base vector of the second macro block, and wherein the determining of the mode determines the mode of the second macro block to be an intra mode when the mode of the first macro block overlapped with the second macro block is the intra mode.

* * * * *